United States Patent [19]
Hofmann

[11] Patent Number: 5,126,606
[45] Date of Patent: Jun. 30, 1992

[54] ELECTRIC DRIVE MOTOR, ESPECIALLY FOR CONTROL AND REGULATION PURPOSES

[75] Inventor: Fritz Hofmann, Munich, Fed. Rep. of Germany

[73] Assignee: Messerschmitt-Bölkow-Blohm GmbH, Munich, Fed. Rep. of Germany

[21] Appl. No.: 594,353

[22] Filed: Oct. 9, 1990

[30] Foreign Application Priority Data

Oct. 26, 1989 [DE] Fed. Rep. of Germany ....... 3935682

[51] Int. Cl.⁵ ............................................ H02K 37/00
[52] U.S. Cl. .................................... 310/49 R; 310/208
[58] Field of Search .................. 310/49 R, 162, 163, 310/164, 205, 206, 207, 208, DIG. 2, 67 R, 129, 112; 318/701, 700

[56] References Cited

U.S. PATENT DOCUMENTS 3,806,744  4/1974  Abraham et al. ................. 310/49 R
4,355,249  10/1982  Kenwell ............................ 310/49 R

FOREIGN PATENT DOCUMENTS

340029   4/1989  European Pat. Off. .
2838379  1/1981  Fed. Rep. of Germany .
3022377  1/1981  Fed. Rep. of Germany .
2941890  4/1981  Fed. Rep. of Germany .

Primary Examiner—Steven L. Stephan
Assistant Examiner—E. To
Attorney, Agent, or Firm—McGlew & Tuttle

[57] ABSTRACT

Electric drive motor, especially for control and regulation purposes, with a pole and coil arrangement for generating a rotating or linearly advancing armature field, which contains pole-forming segments in a plurality of tracks, staggered over time in their excitation phases and geometrically in the direction of movement. The segments are individual segments or are associated with a plurality of coils (without overlapping). Closely stepped tripping. A preferred embodiment of a synchronous motor, such as a hysteresis motor, is described and represented.

16 Claims, 9 Drawing Sheets

COIL GROUP
LAYER 1

FIG. 8a

COIL GROUP
LAYER 2

TRACK 1

FIG. 11a

TRACK 2

FIG. 11b

ELECTRIC DRIVE MOTOR, ESPECIALLY FOR CONTROL AND REGULATION PURPOSES

FIELD OF THE INVENTION

The present invention pertains to electric drive motors, especially for control or regulation purposes, such as servomotors and the like.

BACKGROUND OF THE INVENTION

Known motors of this type often have a rotating or linearly advancing electromagnetic armature field and usually a main supply connection of between, e.g., 110 V and 380 V and 50 or 60 Hz. Conversion into direct current is also frequently employed. Synchronous motors with optional permanent or separate excitation, reluctance motors, hysteresis motors, induction or eddy current motors, stepping motors, or combinations thereof are known. A prior-art d.c. generator with a traveling magnetic wave was described in West German Offenlegungsschriften Nos. DE-OS 29,41,890 and DE-OS 29,38,379.

SUMMARY AND OBJECTS OF THE INVENTION

It is an object of the invention to provide an electric drive motor, especially for control and regulation purposes, which has a simple design, small dimensions, i.e., it is compact, and can be switched in a closely stepped manner.

According to the invention, an electric drive motor is provided, especially for control and regulation purposes. The electric drive motor includes a pole and coil arrangement for generating a rotating or linearly advancing armature field. The arrangement is provided with pole forming segments which either are staggered over time in their armature field excitation phases or geometrically staggered in the direction of movement. Plural tracks are provided for supporting the pole forming segments, additionally staggered at right angles to the direction of movement. The pole forming segments are either formed with individual coils or a plurality of coils. According to another feature of the invention, the pole segments are distributed among the plurality of tracks arranged in a staggered pattern at right angles to the direction of movement of the pole segments and cooperate to define a pole pitch. Fractions of the pitch of one pole segment rather than the entire pole pitch are tripped during the advancement of the armature field. The pole segments may be tripped over a pole pitch of 3/3 or ⅔ of the pitch of the entire pole segment in the direction of the advancing armature field. According to still another aspect of the invention, the motor is designed with an alternating sequence of magnet poles or pole tracks, arranged integrated in pairs in the direction of movement. In this way, zones with preferred magnetic or electrical direction, which extend over a plurality of pole tracks, are provided at right angles to the direction of movement. These zones of preferred magnetic or electrical direction may also extend between the pole tracks provided in the direction of movement of the advancing armature field.

In contrast to the above-mentioned state of the art, where the exciting field is to be further improved, the present invention pertains to an improvement of the armature field.

It is particularly advantageous for the motor according to the present invention to be able to be designed as a very small and simple motor, see for example the prefered embodiments described below. In addition, it can be stepped in very fine steps (in fractions of pole segments). The coil arrangement of the new pole track design according to the invention has no crossovers, so that a simple winding pattern and an inexpensive manufacture are possible. The pole groups may be arranged alternatingly in pairs. Additionally, the coil groups may be arranged in pairs, including mirror-inverted arrangements. In the rotor, zones of preferred electrical or magnetic directions may be provided against the pole tracks at right angles to or in the direction of movement of the traveling armature field. Although the application of the principles of the invention are not limited, the design, according to the invention of a synchronous motor, especially a hysteresis motor with internal rotor, is particularly advantageous. Of course, the motor according to the invention may also be designed as a motor with an external rotor. The use of modern electromagnetic materials, especially those made of pressed and/or possibly plastic-bound powdered material is evident, so that the desired shape of the pole bodies can be easily achieved by machining.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERED EMBODIMENT

The present invention is directed to making an electric drive motor without the prior-art complicated coil shapes and coil overlaps. Therefore, one solution of the present invention is based on manufacture in large lots at low cost per coil and/or manufacture of drives with extremely small dimensions by using simple coils with round wire or band winding in one plane.

Band winding offers the advantage of particularly low cost per unit in a lot and an especially high space filling factor (space filling factor = conductor cross section/coil cross section). In contrast, the round wire winding can be more easily connected into the coil combination.

POLE ADvANCEMENT WINDING WITH BIFILAR ZONES

Figure 1:
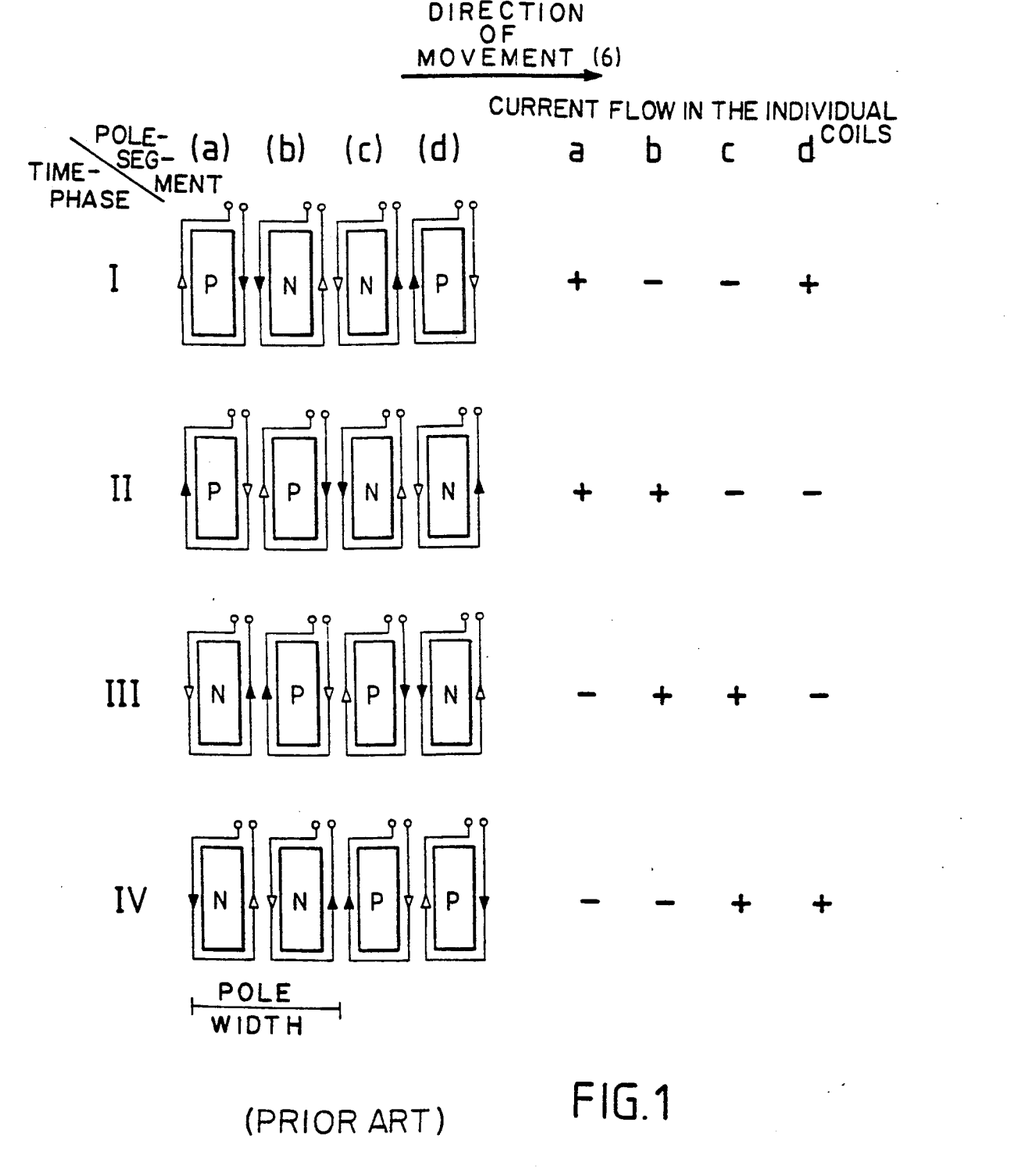
FIG. 1 is a diagrammatic view of pole advancement in the direction of rotation (armature field), see arrow, having a coil wound bifilar zones, wherein distribution of the pole segments into a plurality of coils has not yet been provided.

A possibility for arranging simple coils next to each other without crossover according to the prior art is illustrated in FIG. 1. The individual pole segments carry one coil each and are arranged in a row one after another in the direction of movement of the drive 6. The current flow diagram of the individual coils (a, b, c, d) during the different time phases (I, II, III, and IV) is shown in the left-hand part of the schematic diagram. The pole diagram for the corresponding current of the exciting phases is shown in the right-hand part. The four pole segments or four coils of the example shown require four excitation phases staggered over time from the main supply in order to produce one advancing pair of poles (PP), (NN). However, one disadvantage of this arrangement is the fact that the current flows through considerable conductor zones bifilarly, i.e., without electromagnetic performance, but with conductor losses. The bifilar zones exert a loss-increasing effect especially in drives with a high number of poles or small pole pitch in relation to the width of the drive.

The above-mentioned disadvantages are avoided in the case of the pole and coil arrangement according to the present invention in such a way that simple coils and pole segments are arranged not only in a row one behind another in the direction of movement of the drive, but additionally they are also subdivided into two or more tracks at right angles to the direction of movement. It is important in this connection that the individual pole tracks do not operate fully independently from one another, but form an electromagnetic combination with an overall field advancing in the direction of movement of the drive. If this were not so, as in the case of a mechanical parallel connection of two monophasically excited asynchronous motors, there would be a lack of starting torque. The integration of the electromagnetic field of the individual pole tracks in a common combination can also be facilitated by simple design measures in the secondary element of the drive (see for example FIGS. 10 through 12).

ADVANCING MULTITRACK POLES

Figure 2:
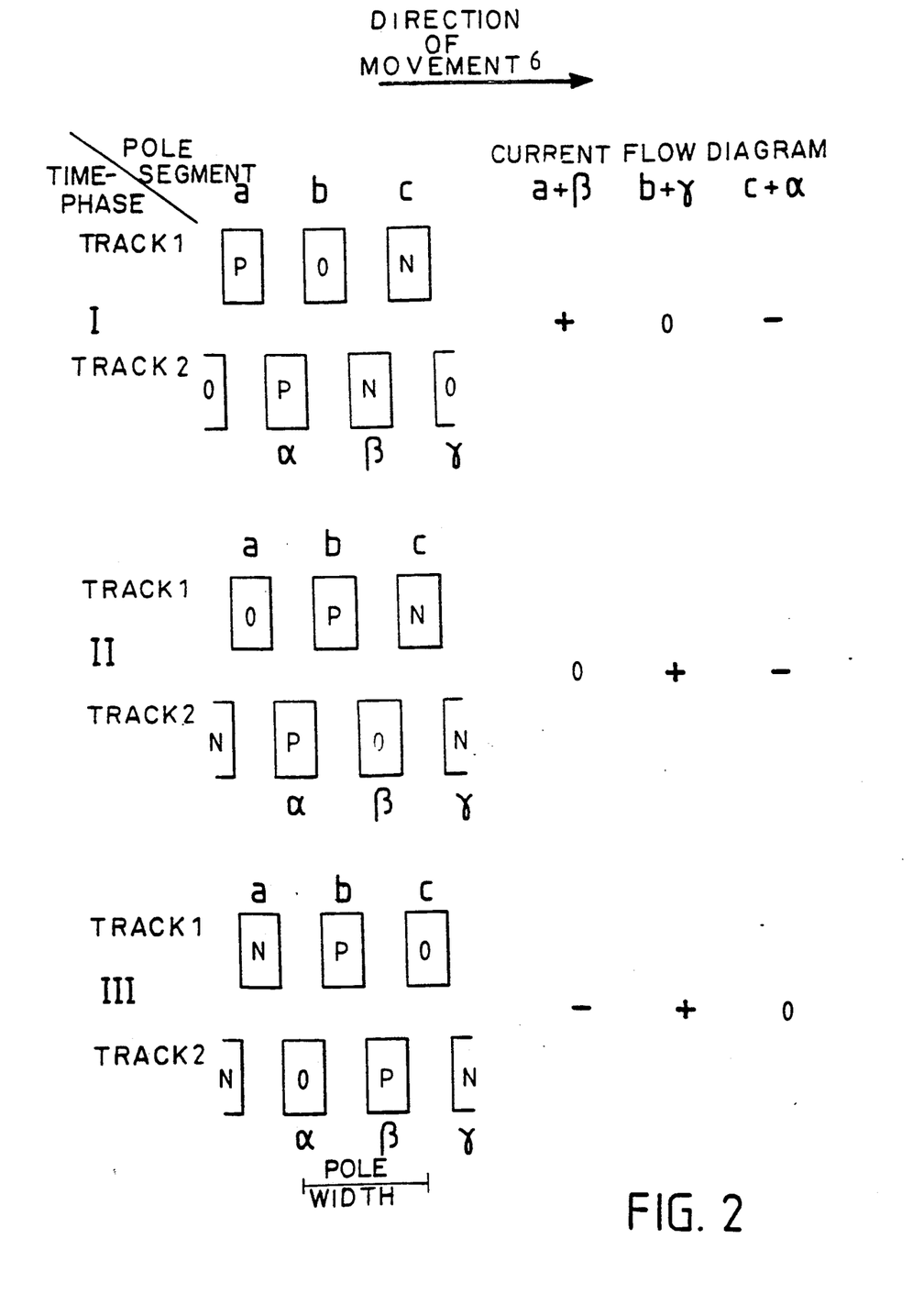
FIG. 2 is a diagrammatic view showing advancement in the direction of movement (armature field), see arrow, in the case of a pluralit of pole tracks.
Figure 7:
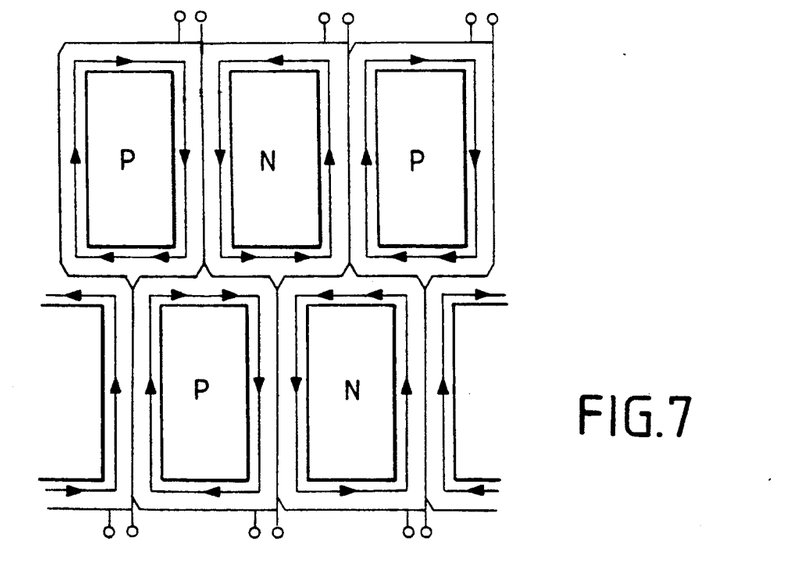
FIG. 7 is a schematic view of a coil arrangement for FIG. 3.

FIG. 2, shows a diagram of an advancing multitrack pole type embodiment of the present invention. The six pole segments (a, b, c, α, β, γ) of the pole diagram shown in FIG. 7 are integrated here into three groups (a+β), (b+γ), (c+α) and form a pair of poles advancing in six time phases. The first three of these time phases (I, II, and III) are shown here. During the other three time phases the polarity of excitation is reversed compared with the first three. The direction of movement of the drive is indicated by arrow 6 in FIG. 2.

ADVANCING MULTITRACK POLE WITH SWITCHABLE POLE PITCH

Figure 3A:
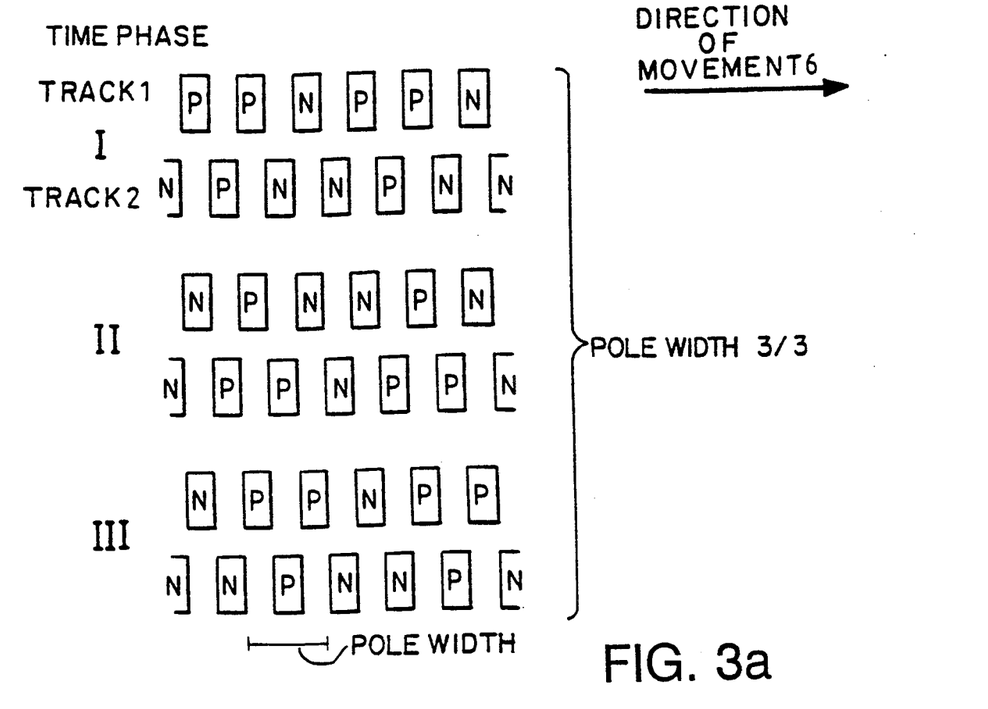
FIG. 3a-3b are diagrammatic view showing an advancement in the direction of movement (armature field), see arrow, in pole segments that can be tripped in fractions of pole pitch.
Figure 3B:
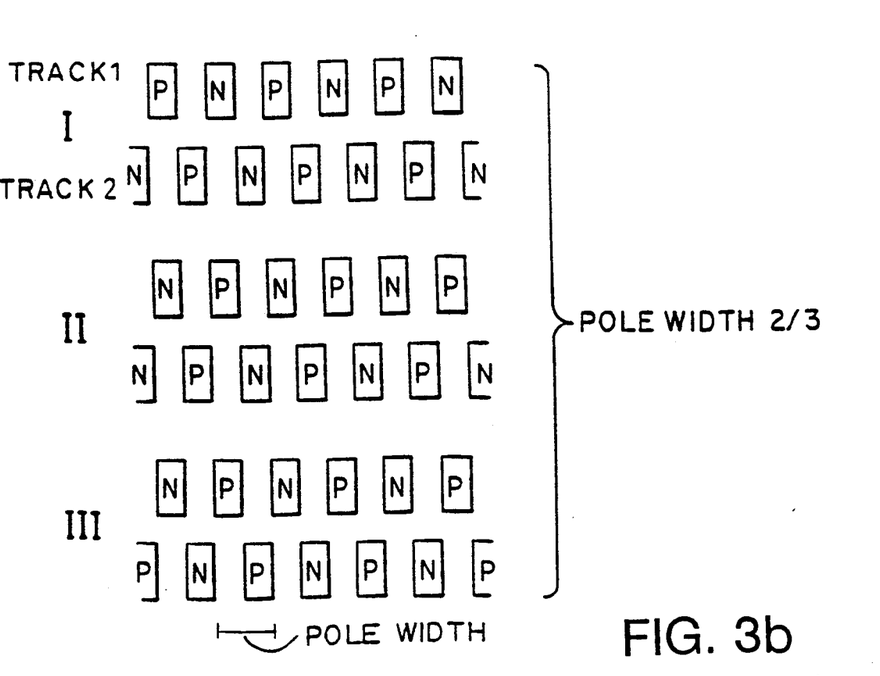

FIG. 3 is a diagram of an advancing multitrack pole with a switchable pole pitch according to the invention. The arrangement is similar to the pole arrangement of FIG. 2 however, the resulting pole pitch is switched over in a ratio of 2:3, so that switching over of the ratio of the synchronous running speed to the frequency of exciting currents is achieved. Asynchronous drives with switchable pole pitch have been used for rotation speed control for some time. In addition to the tripping and pole reversal, fine control can also be performed due to the variable value of the supply voltage.

Figure 4:
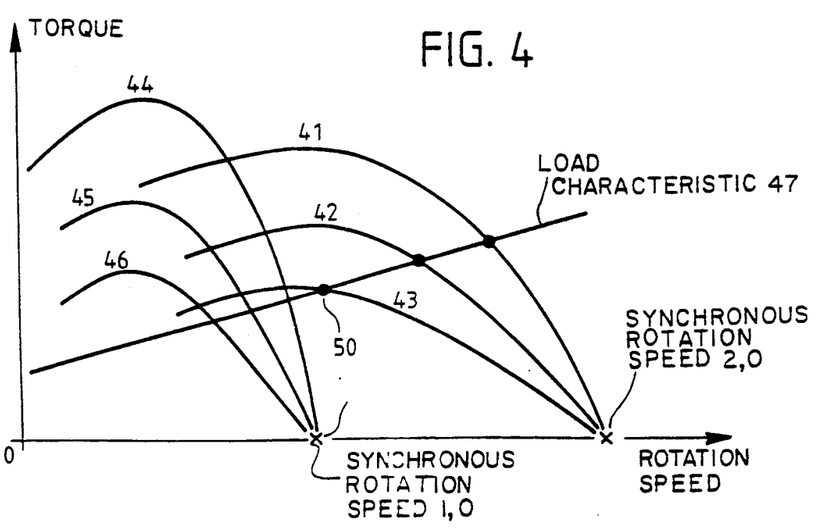
FIG. 4 is a diagrammatic view showing advancement in the direction of movement (armature field), see arrow, with pole segments that can be tripped in fractions of pole pitch.

FIG. 4 shows a 1:2 switching under a load that progresses with the rotation speed. The load torque is shown in FIG. 4 as a function of the rotation speed. In the example shown, the motor develops the torque characteristics 41, 42, 43 at full pole pitch, depending on the voltage value, or the torque characteristics 44, 45, 46 at half the pole pitch. The points of intersection with the load characteristic 47 define the working speed in all cases. However, this type of rotation speed control is unfavorable, especially close to the working point 50, because here a relatively great slip between the synchronous rotation speed and the working rotation speed coincides with a relatively high load torque. The power loss (slip speed × load torque) is very high here, and the angle of intersection between the load characteristic and the motor characteristic is so flat that the stability of the rotation speed is jeopardized.

Figure 5:
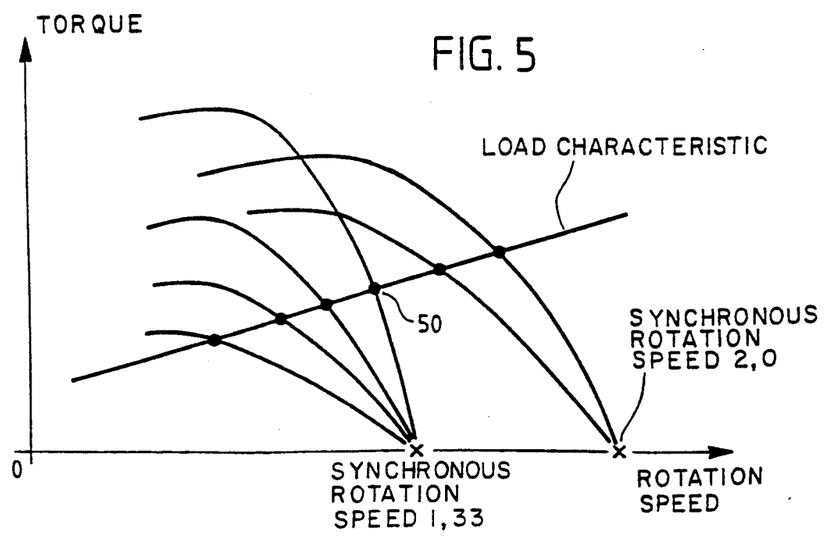
FIG. 5 is a diagrammatic view showing a 1.33:2 pole pitch advancement in the case of a load progressing with rotation speed.

FIG. 5 shows a 1.33:2 switching for a load that progresses with the rotation speed, which offers the advantage of a more closely stepped pole pitch switching, which is possible in the case of a pole and coil arrangement according to the present invention. The load torque is plotted as a function of the rotation speed in FIG. 5. In addition, the pole arrangement shown in FIG. 3 can also be grouped such that the resulting pole pitch can be switched in three steps (0.67:1.0:2.0) and the supplementary change in the value of the supply voltage is needed only as a fine regulation, especially at low rotation speeds. The possible expansion of this scheme by increasing the number of pole segments and/or the pole tracks ultimately ensures a highly flexible rotation speed control, without having to change the frequency of the supply voltage.

Figure 6:
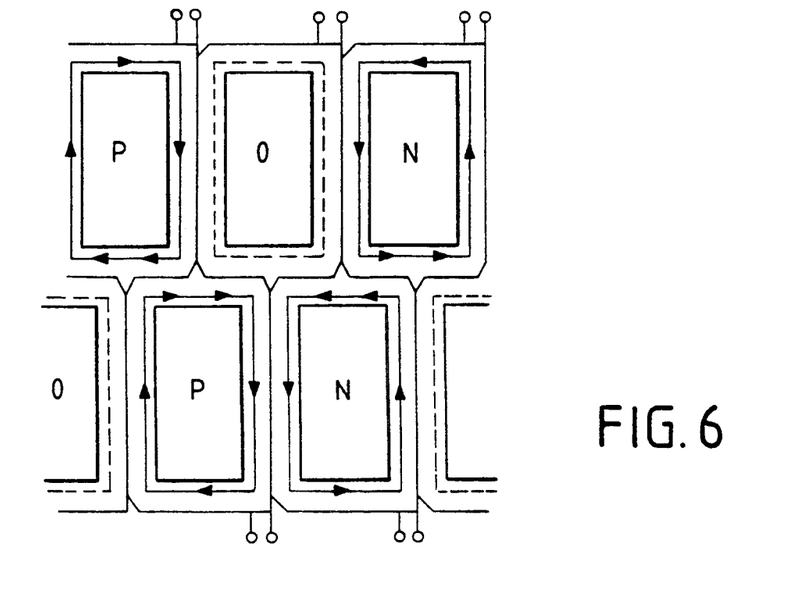
FIG. 6 is a schematic view of a coil arrangement for FIG. 2.

FIG. 6 (coil arrangement for FIG. 2) shows a preferred solution for designing the coils for the corresponding pole arrangement. The remaining zones through which current flows bifilarly are small compared with the diagram in FIG. 1, especially in the case of a drive with a great number of poles or with small pole pitch in relation to the width of the drive.

FIG. 7 (coil arrangement for FIG. 3) correspondingly applies to the case of such a pole diagram.

Figure 8A:
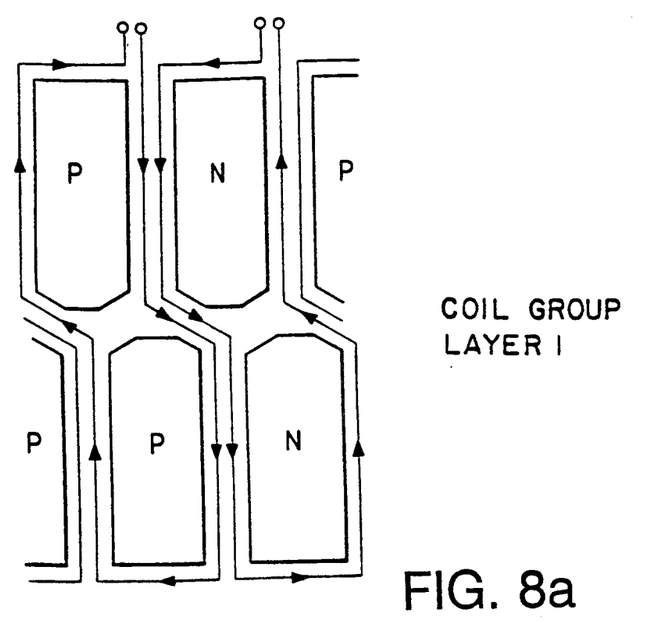
FIGS. 8a-8b are schematic views showing a coil arrangement between the pole segments, with two layers one over another (without wire crossover)
Figure 8B:
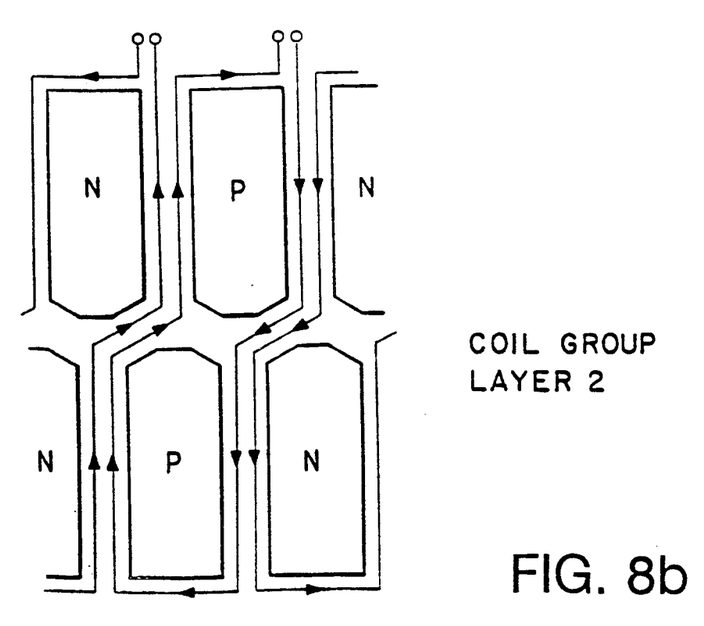
Figure 9A:
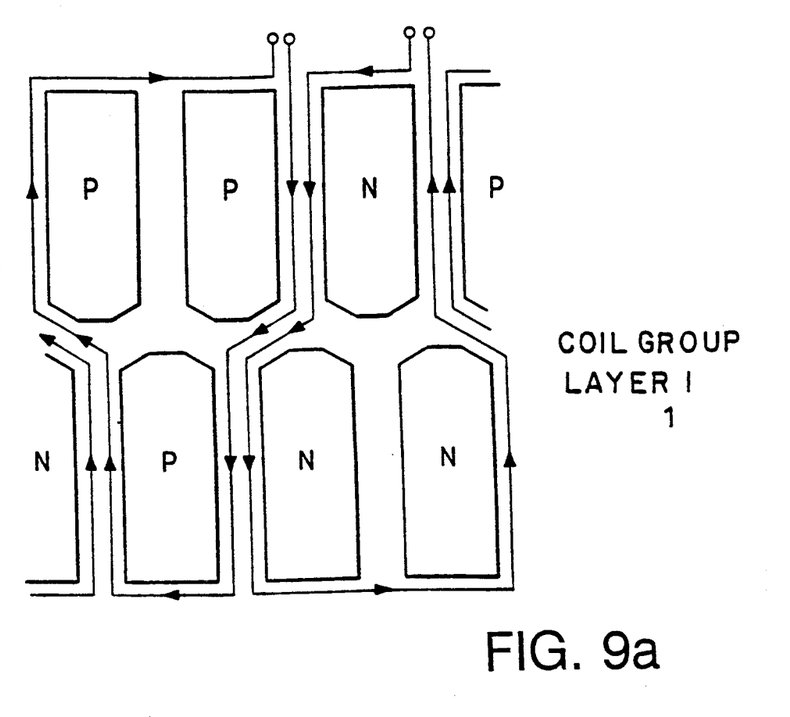
FIG. 9a-9b are schematic views of another coil arrangement with two layers one over another (without wire crossover)
Figure 9B:
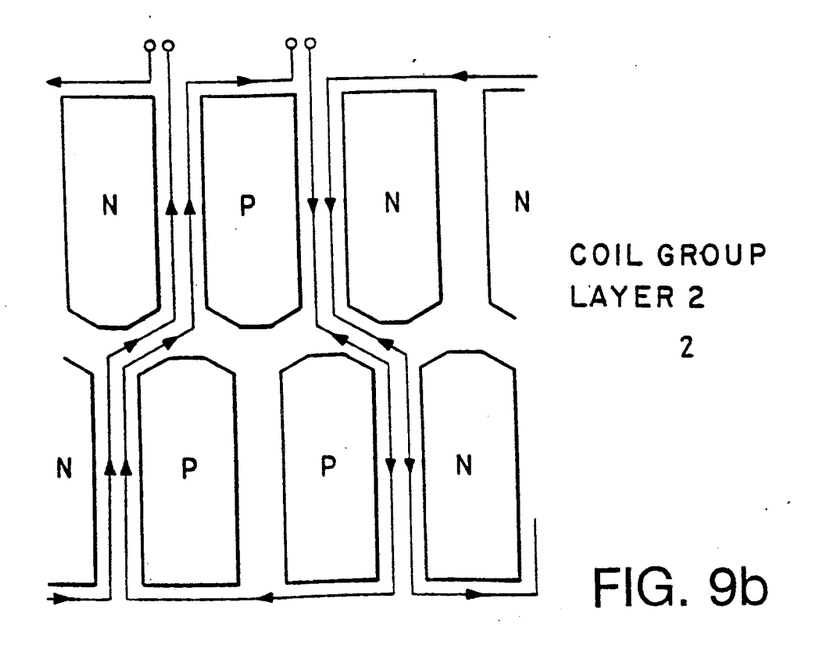

While the individual coils are inserted in one layer into the winding spaces between the pole segments in FIG. 6 and FIG. 7, the coils are placed in two layers one above another in FIG. 8 and FIG. 9 at the bottom. However, it should be noted that the coils of a layer do not reach over one another, and therefore simple coils with a principal coil plane associated with the corresponding layer can be used here as well.

FIG. 8 (coil arrangement for FIG. 3) applies to the case shown at the bottom of FIG. 3; FIG. 9 (coil arrangement for FIG. 3) applies to the case shown at the top of FIG. 3. Here, each coil comprises two or three pole segments consisting of different pole tracks. For pole pitch switching, the individual coils must be connected together in different groups, e.g., a plurality of individual coils are connected together, as shown in FIG. 7. Coils which comprise more than one pole segment each can, of course, also cooperate switchably in different groupings. In FIG. 9 consecutive pole segments are shown integrated by coils into one pole piece row to form an alternating mirror-inverted arrangement.

It was pointed out before that the different pole tracks should form at least partially an electromagnetic combination to generate the starting forces.

Figure 10:
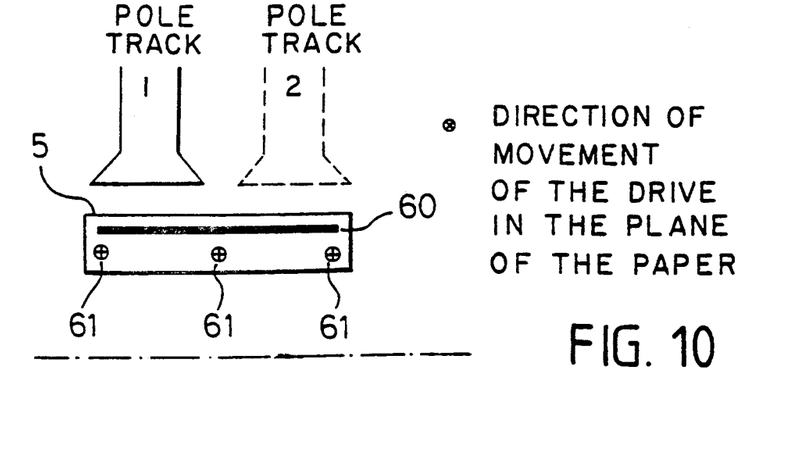
FIG. 10 is a schematic view of electromagnetic connection of pole track a corresponding coil arrangement.

FIG. 10 (electromagnetic combination of two pole tracks) shows, in a section plane at right angles to the direction of movement of the drive, how the natural combined formation that is present anyway can be reinforced by defined electrically conducting, and/or magnetically conducting, and/or permanent magnetic material zones 60, and/or material zones 60 formed by hysteresis material, which material zones are located in the secondary element 5 at right angles to the direction of movement of the drive 6. Additional defined material zones 61 in the direction of movement of the drive can supplement the development of the secondary element.

Figure 11A:
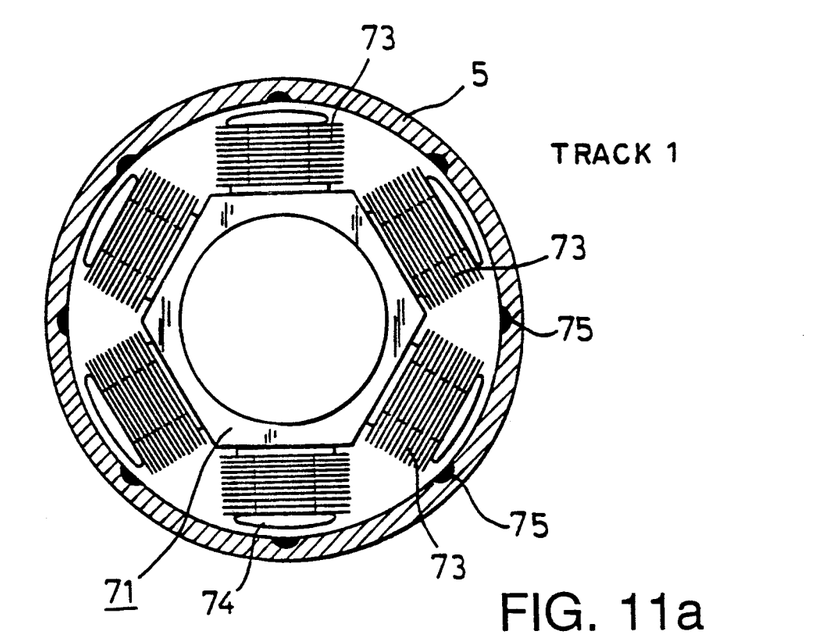
FIG. 11a-11b are schematic views of a hysteresis motor with two pole tracks.
Figure 11B:
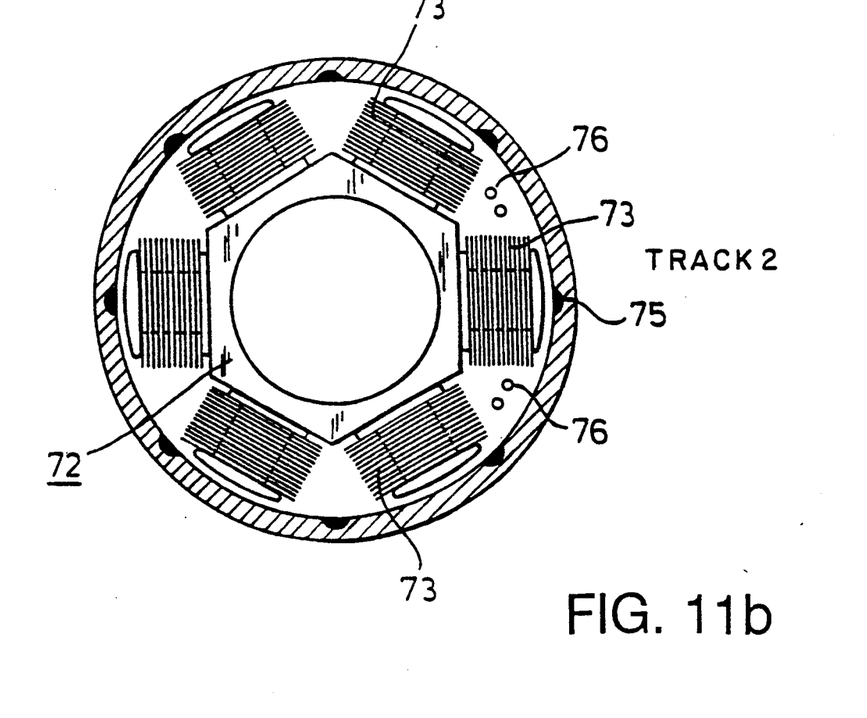

FIG. 11 shows a hysteresis motor with two pole tracks as an example corresponding to pole tracks 1 and 2 of FIG. 10 with one left pole body and one right pole body 71, 72 and six pole segments per pole body. A simple exciting coil 73 and subsequently a pole cap 74 are mounted on each pole segment. In this example, the secondary element 5 is designed as an external rotor. It consists of hysteresis material, in which special conductor zones 75 are prepared by etching and vapor deposition. The individual pole body is produced from electromagnetic powder material that can be processed by machining. The left and right pole bodies are staggered geometrically through 30°. The intermediate space 76 between the individual pole segments is used to connect the winding of the left pole body to the right side of the motor. An individual pole body can now operate optionally with one pair of poles or two pairs of poles according to the following pole advancement diagram:

| I | O P P O N N | |
| II | N O P P O N | one pair of poles |
| III | N N O P P O | |
| or | | |
| I | O P N O P N | |
| II | N P O N P O | two pairs of poles |
| III | N O P N O P. | |

However, the pairing of one left and one right pole body each permits (besides the operation with one pair of poles), two or more pairs of poles, as desired:

| I | O P N O P N | |
|   | P O N P O N | |
| II | N P O N P O | two pairs of poles |
|    | O P N O P N | |
| III | N O P N O P | |
|     | N P O N P O | |
| or | | |

| I | P N P N P N | |
|   | P N P N P N | |
| II | N P N P N P | |
|    | P N P N P N | three pairs of poles |
| III | N P N P N P | |
|     | N P N P N P. | |
| IV | P N P N P N | |
|    | N P N P N P | |

INTERNAL ROTOR HYSTERESIS MOTOR

Figure 12:
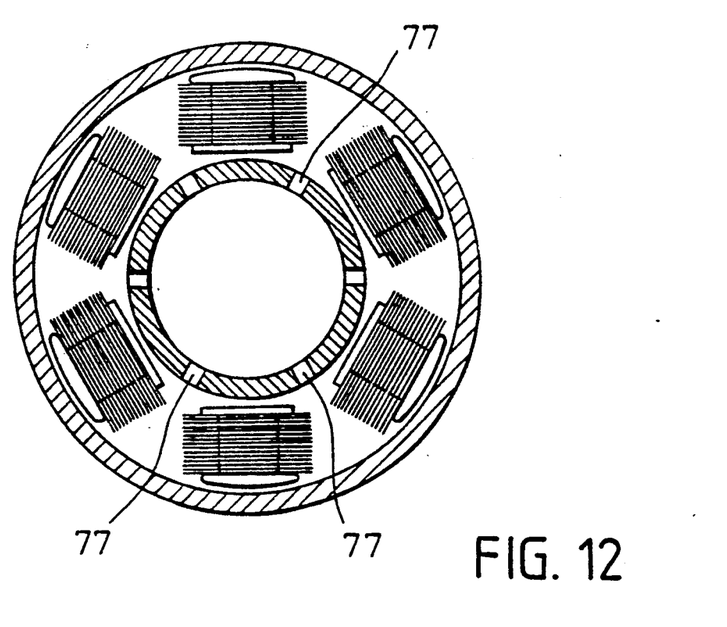
FIG. 12 is a schematic view of a hysteresis motor as an internal rotor motor.

In FIG. 12 a hysteresis motor design is shown with an internal rotor. The pole bodies according to the embodiment of FIG. 11 are modified only slightly in order to form a motor with an internal rotor. The holes 77 are used to reduce the stray flux between adjacent pole segments with different polarity.

While specific embodiments of the invention have been shown and described in detail to illustrate the application of the principles of the invention, it will be understood that the invention may be embodied otherwise without departing from such principles.

What is claimed is:

1. An electrical drive motor, for control and regulation purposes, comprising: two parallel rows of pole pieces extending in a direction of forward drive, each of said pole pieces having a pole pitch; coils positioned straddling both rows of pole pieces for exciting said pole pieces such that pole pieces surrounded by individual ones of said coils are offset relative to each other in the direction of forward drive by a fraction of a pole pitch, said coils being arranged in two layers such that two successively excited coils of different layers are wound around the same pole piece in a pole piece groove and wound around adjacent pole pieces in another pole piece groove.

2. An electrical drive motor according to claim 1, wherein consecutive pole pieces are integrated by coils into one pole piece row to form an alternating mirror-inverted arrangement of poles.

3. An electrical drive motor according to claim 1, wherein zones with magnetic or electrical preferential direction are provided at right angles to a direction of extension of the pole piece rows.

4. An electrical drive motor according to claim 1, wherein said motor is designed as a synchronous motor.

5. An electrical drive motor according to claim 1, wherein said motor is designed as a hysteresis motor.

6. An electrical drive motor according to claim 1, further comprising an internal rotor surrounded by said poles.

7. An electrical drive motor according to claim 1, further comprising ane xternal rotor surrounding said poles.

8. An electrical drive motor according to claim 1, wherein said coils are wound around carbon pieces, said coils being provided as a strip winding.

9. An electrical drive motor, for control and regulation purposes, comprising two parallel rows of pole pieces extending in a direction of forward drive, each of said pole pieces having a pole pitch; coils straddling both of said rows, for exciting said pole pieces, such that pole pieces surrounded by individual ones of said coils are offset relative to one another, in the direction of forward drive, by a fraction of a pole segment pitch, said coils surrounding one pole segment in one row of said two rows of pole pieces and surrounding two adjacent pole segments in another row of said two rows of pole pieces, said coils being arranged in two layers and successively excited coils surrounding a common pole segment in said two rows of pole pieces.

10. An electrical drive motor according to claim 9, wherein consecutive pole segments are integrated by coils into one pole segment row such that said pole segments form an alternating mirror-inverted arrangement.

11. An electrical drive motor according to claim 9, wherein zones with magnetic or electrical preferential direction are provided at right angles to a direction of extension of the pole segment rows.

12. An electrical drive motor according to claim 9, wherein said motor is designed as a synchronous motor.

13. An electrical drive motor according to claim 9, wherein said motor is designed as a hysteresis motor.

14. An electrical drive motor according to claim 9, further comprising an internal rotor surrounded by said pole segments.

15. An electrical drive motor according to claim 9, further cmprising an external rotor surrounding said pole segments.

16. An electrical drive motor according to claim 9, wherein said coils are wound around carbon pieces, said coils being designed as a strip winding.

* * * * *